US011478696B2

(12) United States Patent
Wang

(10) Patent No.: US 11,478,696 B2
(45) Date of Patent: Oct. 25, 2022

(54) INTERACTION METHOD AND APPARATUS FOR LOCKING TARGET IN GAME

(71) Applicant: NETEASE (HANGZHOU) NETWORK CO., LTD., Zhejiang (CN)

(72) Inventor: Junxiang Wang, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 143 days.

(21) Appl. No.: 16/016,700

(22) Filed: Jun. 25, 2018

(65) Prior Publication Data
US 2019/0022521 A1  Jan. 24, 2019

(30) Foreign Application Priority Data

Jul. 18, 2017  (CN) .......................... 201710586008.4

(51) Int. Cl.
*A63F 13/00*    (2014.01)
*G06F 3/00*    (2006.01)
(Continued)

(52) U.S. Cl.
CPC ........ *A63F 13/2145* (2014.09); *A63F 13/537* (2014.09); *G06F 3/0488* (2013.01);
(Continued)

(58) Field of Classification Search
CPC ............... A63F 13/2145; A63F 13/537; A63F 2009/241; G06F 3/04842; G06F 3/04845;
(Continued)

(56) References Cited

U.S. PATENT DOCUMENTS 8,448,095 B1 * 5/2013 Haussila ............... G06F 3/0481
715/863
2005/0069225 A1 * 3/2005 Schneider ...... H04N 21/234318
382/305
(Continued)

FOREIGN PATENT DOCUMENTS

CN  104635925 A  5/2015
CN  104699399 A  6/2015
(Continued)

OTHER PUBLICATIONS

Search report of CN Priority application No. 201710586008.4 filed on Jul. 18, 2017, dated Jun. 22, 2018.

Primary Examiner — Milap Shah
Assistant Examiner — Jason Pinheiro
(74) Attorney, Agent, or Firm — Gang Yu

(57) ABSTRACT

An interaction method and apparatus for locking a target in a game is provided. The method includes that: when detecting a preset touch operation of a touch medium within an effective operation range of a first operation icon, a first position is determined in a game interface, a sliding touch operation of the touch medium is detected, and the first position is updated according to a sliding trace of the touch medium; an optional virtual character is determined from the at least one optional virtual character as a preselected virtual character; visual marking is performed on the preselected virtual character so as to distinct from other optional virtual characters; and when detecting the touch medium leaves a touch screen, the present preselected virtual character is locked as a target virtual character of the first operation.

19 Claims, 3 Drawing Sheets

(51) Int. Cl.
*A63F 13/2145* (2014.01)
*A63F 13/537* (2014.01)
*G06F 3/04842* (2022.01)
*G06F 3/0488* (2022.01)
*G06F 3/04883* (2022.01)
*G06F 3/04847* (2022.01)
*G06F 3/04845* (2022.01)

(52) U.S. Cl.
CPC ...... *G06F 3/04842* (2013.01); *G06F 3/04845* (2013.01); *G06F 3/04847* (2013.01); *G06F 3/04883* (2013.01)

(58) Field of Classification Search
CPC . G06F 3/04847; G06F 3/0488; G06F 3/04883
See application file for complete search history.

(56) References Cited

U.S. PATENT DOCUMENTS

| | | | |
|---|---|---|---|
| 2010/0171712 A1* | 7/2010 | Cieplinski | G06F 3/04883 345/173 |
| 2010/0285881 A1* | 11/2010 | Bilow | A63F 9/24 463/37 |
| 2011/0014983 A1* | 1/2011 | Miller, IV | G06F 3/0488 463/37 |
| 2012/0056836 A1* | 3/2012 | Cha | G06F 3/04842 345/173 |
| 2012/0306772 A1* | 12/2012 | Tan | G06F 40/166 345/173 |
| 2018/0082517 A1* | 3/2018 | Derome | A63F 13/10 |

FOREIGN PATENT DOCUMENTS

| | | |
|---|---|---|
| CN | 104898953 A | 9/2015 |
| WO | 2017059684 A1 | 4/2017 |

\* cited by examiner

INTERACTION METHOD AND APPARATUS FOR LOCKING TARGET IN GAME

The present disclosure claims priority of Chinese Patent Application No. 201710586008.4, filed on Jul. 18, 2017 and named after "Interaction Method and Apparatus for Locking Target in Game". Contents of the present disclosure are hereby incorporated by reference in entirety of the Chinese Patent Application.

TECHNICAL FIELD

The present disclosure relates to the technical field of games, and in particular to an interaction method and apparatus for locking a target in a game.

BACKGROUND

It is usually necessary to lock a target to accurately execute a corresponding operation (such as, an attack operation) in a game running in a mobile terminal (particularly to a mobile terminal with a touch screen controlled by touch operations). However, a target locking method in related art has many defects, for example, inconvenience and non-intuitiveness for operations of a user.

SUMMARY

At least one embodiment of the present disclosure provides an interaction method and apparatus for locking a target in a game, so as at least to partially solve technical problems of non-intuitiveness for operation, discontinuous operation, high memorization cost and low space utilization rate in an interaction method for locking a target in a game running in a mobile terminal.

In an embodiment of the present disclosure, an interaction method for locking a target in a game is provided, which is applied to a mobile terminal including a touch screen, a content rendered on the touch screen including a game interface and the game interface including a first operation icon, a user virtual character and at least one optional virtual character, and the user virtual character is configured to execute a first operation corresponding to the first operation icon at least according to a received first interaction instruction, the method including that:

when detecting a preset touch operation of a touch medium within an effective operation range of the first operation icon, determining a first position in the game interface, detecting a sliding touch operation of the touch medium, and updating the first position according to a sliding trace of the touch medium; determining an optional virtual character from the at least one optional virtual character as a preselected virtual character, and the position of the optional virtual character and the updated first position meet a preset condition; performing visual marking on the preselected virtual character so as to distinct from other optional virtual characters; and when detecting the touch medium leaves the touch screen, locking the preselected virtual character as a target virtual character of the first operation.

In an embodiment of the present disclosure, an interaction apparatus for locking a target in a game is provided, which should be configured for a mobile terminal including a touch screen, and a content rendered on the touch screen includes a game interface, and the game interface includes a first operation icon, a user virtual character and at least one optional virtual character, and the user virtual character is configured to execute a first operation corresponding to the first operation icon at least according to a received first interaction instruction, the apparatus including:

a position detection unit, configured to, when detecting a preset touch operation of a touch medium within an effective operation range of the first operation icon, determine a first position according to a position of a present touch point of the touch medium, detect a sliding touch operation of the touch medium and update the first position according to a sliding trace of the touch medium; a pre-selection determination element, configured to determine an optional virtual character from the at least one optional virtual character as a preselected virtual character, and the position of the optional virtual character and the updated first position meet a preset condition; a visual marking unit, configured to perform visual marking on the preselected virtual character so as to distinct from other optional virtual characters; and a target locking unit, configured to, when detecting the touch medium leaves the touch screen, lock the present preselected virtual character as a target virtual character of the first operation.

In an embodiment of the present disclosure, an electronic device is provided, which includes: a processor; and a memory, configured to store at least one instruction executable for the processor, and the processor is configured to execute the at least one instruction to execute any abovementioned method.

In an embodiment of the present disclosure, a computer-readable storage medium is provided, on which a computer program is stored, the computer program being executed by a processor to implement any abovementioned method.

In the at least one embodiment of the present disclosure, when detecting the preset touch operation of the touch medium within the effective operation range of the first operation icon, the first position is determined according to the position of the present touch point of the touch medium, the sliding touch operation of the touch medium is detected, and the first position is updated according to the sliding trace of the touch medium; the optional virtual character is determined from the at least one optional virtual character as a preselected virtual character, and the position of the optional virtual character and the updated first position meet a preset condition; visual marking is performed on the preselected virtual character so as to distinct from the other optional virtual characters; and when detecting the touch medium leaves the touch screen, the present preselected virtual character is locked as the target virtual character of the first operation. The technical problems of non-intuitiveness for operation, discontinuous operation, high memorization cost and low space utilization rate in an interaction method for locking the target in the game running in the mobile terminal are further solved.

DETAILED DESCRIPTION

For making the solutions of the present disclosure better understood by those skilled in the art, the technical solutions in the embodiments of the present disclosure will be clearly and completely described below in combination with the drawings in the embodiments of the present disclosure. Obviously, the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

It is important to note that terms "first", "second" and the like in the specification, claims and drawings of the present disclosure are adopted not to describe a specific sequence or order but to distinguish similar objects. It should be understood that data used like this may be interchanged under a proper circumstance for implementation of the embodiments, described herein, of the present disclosure in a sequence besides those shown or described herein. In addition, terms "include" and "have" and any transformation thereof are intended to cover nonexclusive inclusion. For example, a process, method, system, product or equipment including a series of steps or units is not limited to the steps or units which are clearly listed, but may include other steps or units which are not clearly listed or intrinsic to the process, the method, the product or the equipment.

Figure 1:
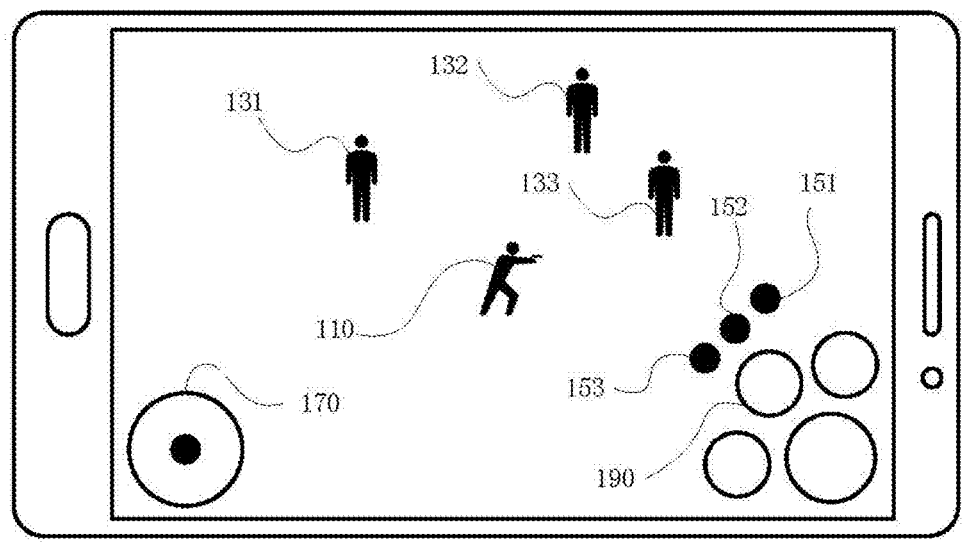
FIG. 1-2 are schematic diagrams of a target locking method according to the related art.
Figure 2:
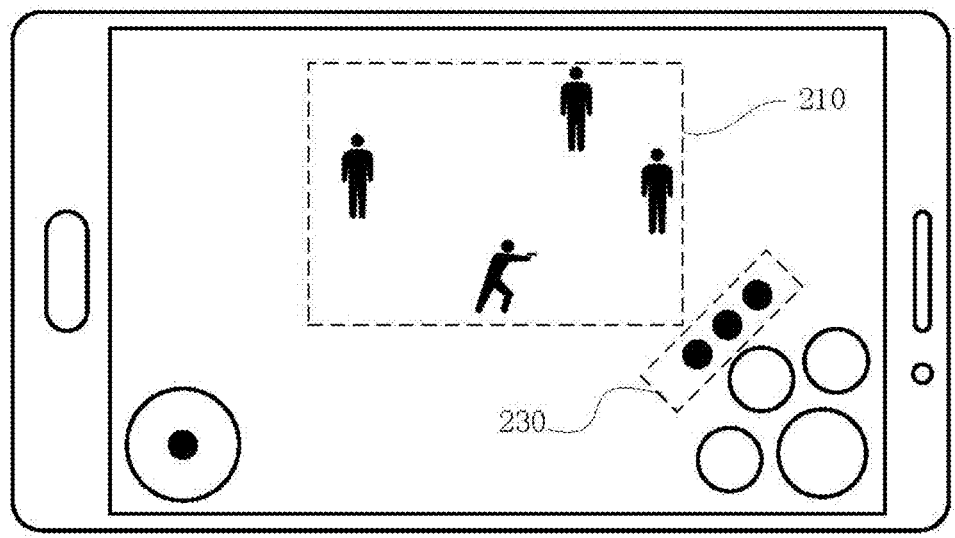

FIG. 1-FIG. 2 are schematic diagrams of a method for locking a target in a game according to the related art. As shown in FIG. 1, a motion controller 170 is located at a left lower part of a screen of a mobile terminal. A plurality of skill icons 190 are located at a right lower part of the screen of the mobile terminal. When the distance between each of enemy characters 131, 132 and 133 and a character 110 controlled by a user is within a predetermined range, portraits 151, 152 and 153 respectively corresponding to the enemy characters 131, 132 and 133 are rendered in the vicinity of the skill icons 190. The user clicks at least one of portraits 151, 152 and 153 to lock a corresponding enemy character. However, such a target locking solution at least has the following defects.

A first defect: a core battle visual region (such as, a region 210 shown in FIG. 2) the user pays attention to is not overlapped with a portrait identification visual region (such as, a region 230 shown in FIG. 2), which makes the operations are non-intuitive for the user.

A second defect: the user is required to additionally memorize a corresponding relationship between a portrait of each virtual character and a character image of this virtual character, in order to accurately select a virtual character to be locked.

A third defect: the user is required to observe a portrait region and simultaneously pays attention to a practical battle condition of a core battle region for further operation. Clicking the portraits seemingly shortens operation time of the user, but prolongs judgment time of the user, so that smoothness of the operation is reduced.

A fourth defect: an additional space is required to arrange at least one portrait of the target, so that interference may be brought to regions (including a skill operation region and the core battle region) the user pays attention to.

For the above problems, there is yet no effective solution proposed at present.

In an embodiment of the present disclosure, an interaction method for locking a target in a game is provided. It is important to note that the steps shown in the flowchart of the drawing may be executed in a computer system, for example, a group of computers, capable of executing instructions. Moreover, although a logic sequence is shown in the flowchart, the shown or described steps may be executed in a sequence different that shown herein under some circumstances.

Figure 3:
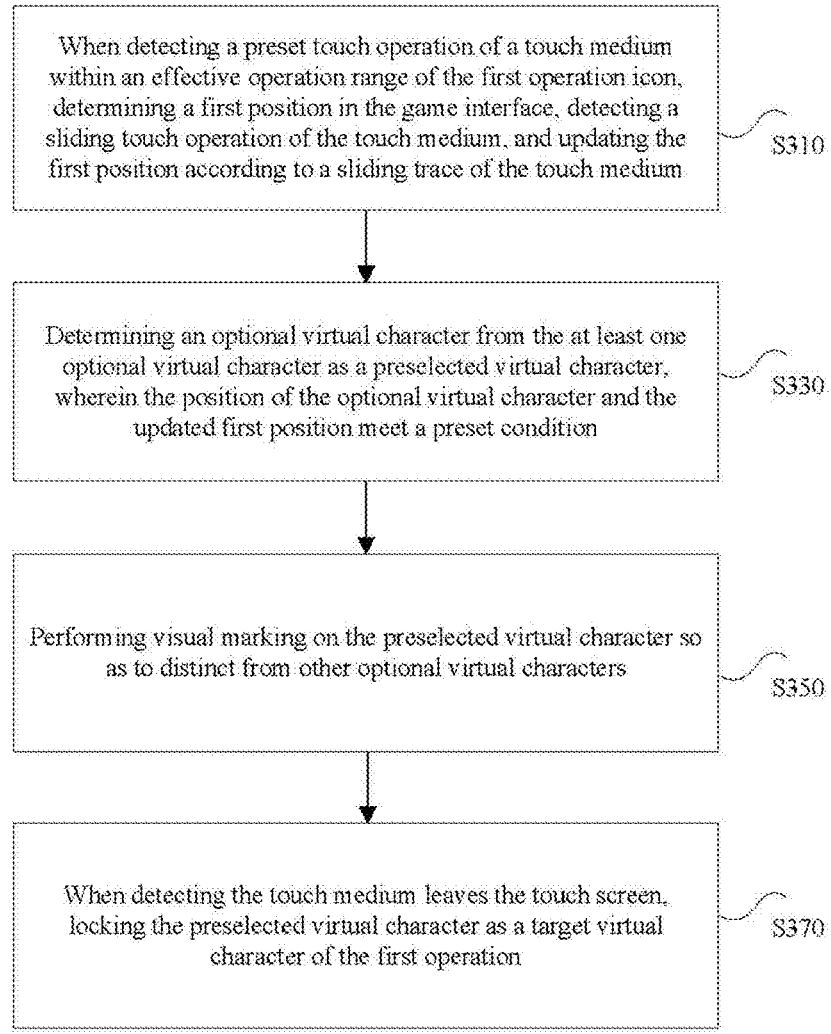
FIG. 3 is a flowchart of an interaction method for locking a target in a game according to an embodiment of the present disclosure.

FIG. 3 is a flowchart of an interaction method for locking a target in a game according to an embodiment of the present disclosure. The method is applied to a mobile terminal with a touch screen. A content rendered on the touch screen includes a game interface. The game interface includes a first operation icon, a user virtual character, and at least one optional virtual character. The user virtual character is configured to execute a first operation corresponding to the first operation icon at least according to a received first interaction instruction. As shown in FIG. 3, the method may include the following steps.

At Step S310, when detecting a preset touch operation of a touch medium within an effective operation range of the first operation icon, a first position is determined in the game interface, a sliding touch operation of the touch medium is detected, and the first position is updated according to a sliding trace of the touch medium.

At Step S330, an optional virtual character is determined from the at least one optional virtual character as a preselected virtual character. And the position of the optional virtual character and the updated first position meet a preset condition.

At Step S350, visual marking is performed on the preselected virtual character so as to distinct from other optional virtual characters.

At Step S370, when detecting the touch medium leaves the touch screen, the present preselected virtual character is locked as a target virtual character of the first operation.

By the interaction method for locking the target in the exemplary embodiment, the following technical effects may be achieved. First, a core battle visual region a user pays attention to is overlapped with a target selection region during a locking process, so that the user may pay attention to the same region in observation, selection and locking operation processes, and a more intuitive operation is achieved. Second, the user is not required to additionally memorize the portraits of virtual characters, so that difficulty of the operation is reduced. Third, a target locking operation is triggered within the effective operation range of the first operation icon, so that at least one existing operation is prevented from being interrupted, and continuity of operation is improved. Fourth, no additional screen space is required to display the portraits of the virtual characters, so that a skill operation region or a battle display region may be prevented from being covered. A convenient and accurate target locking method is provided to meet a requirement of the user, and a game experience of the user is further improved.

In an exemplary embodiment, the touch medium can be at least one finger, a touch pencil and the like.

Each step of the interaction method for locking the target in the game in the exemplary embodiment will further be described below.

At Step S310, when detecting the preset touch operation of the touch medium within the effective operation range of the first operation icon, the first position is determined in the game interface, the sliding touch operation of the touch medium is detected, and the first position is updated according to the sliding trace of the touch medium.

The step of determining the first position in the game interface includes that: the first position is determined according to a position of a present touch point of the touch medium.

In the embodiment, when detecting the preset touch operation of the touch medium within the effective operation range of the first operation icon, the first position is determined according to the position of the present touch point of the touch medium, the sliding touch operation of the touch medium is detected, and the first position is updated according to the sliding trace of the touch medium.

Figure 4:
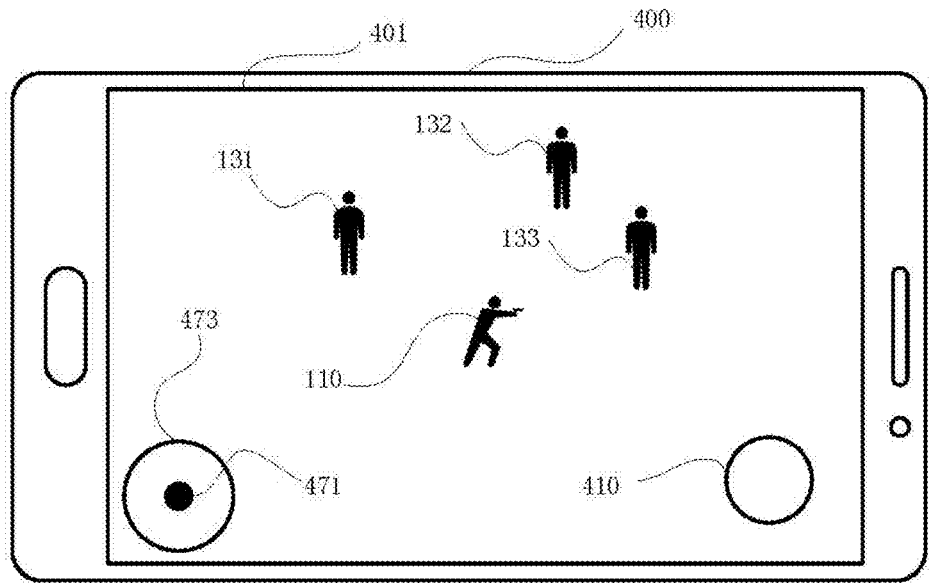
FIG. 4 is a schematic diagram of a game interface according to an exemplary embodiment of the present disclosure.

FIG. 4 is a schematic diagram of a game interface according to an exemplary embodiment of the present disclosure. As shown in FIG. 4, a mobile terminal 400 includes a touch screen. A content rendered on the touch screen includes a game interface 401. The game interface 401 includes a first operation icon 410, a user virtual character 110 and optional virtual characters 131, 132 and 133. The user virtual character 110 is configured to execute the first operation corresponding to the first operation icon 410 at least according to the received first interaction instruction.

The game interface 401 may occupy the whole space of the touch screen (as shown in FIG. 4) and may also occupy a part of the space of the touch screen (for example, occupying a half of the space of the touch screen), which is not limited in the present disclosure.

The game interface 401 may include an operation control and a game scene. The operation control may be configured to receive an operation of the user. For example, the operation control is a motion controller (including an operation auxiliary object 471 and a region auxiliary object 473) located at a left lower part of the game interface in FIG. 4. The user may drag the operation auxiliary object 471 on the touch screen to change a position of the operation auxiliary object in the region auxiliary object 473. The mobile terminal 400 may detect a position change of the operation auxiliary object 471 in the region auxiliary object 473 to generate a corresponding interaction instruction for controlling movement of the user virtual character 110 in the game scene.

The motion controller located at the left lower part of the game interface in FIG. 4 is configured to control at least one of movement and orientation of the user virtual character 110. A shape of the motion controller may be a circle, or the other shapes (for example, an ellipse and a hexagon). As shown in FIG. 4, the motion controller is located on a left side of the game interface 401 and the first operation icon 410 is located on a right side of the game interface 401. However, the first operation icon 410 and the motion controller may also be respectively arranged at other positions. For example, the motion controller is located on the right side of the game interface 401 and the first operation icon 410 is located on the left side of the game interface 401. There are no limits made in the present disclosure.

The first operation icon may be a normal attack icon or a skill icon. A skill indicated by the skill icon may be an attack skill (for example, a skill capable of reducing a Health Points (HP) value of at least one of enemy characters), a regeneration skill (for example, a skill capable of increasing a HP value of at least one of ally characters), and a freezing skill (for example, a skill capable of stopping or slowing down actions of the enemy character). The skill indicated by the skill icon may be a skill with a direction-selecting, and may also be a skill without the direction-selecting (namely released by a click). The user virtual character 110 may execute the first operation corresponding to the first operation icon 410 according to the received first interaction instruction (for example, an interaction instruction generated according to a touch operation acting on the first operation icon). In an optional embodiment, the first operation icon is preferably a normal attack icon.

The game scene may include the user virtual character 110 and the optional virtual characters 131, 132 and 133. The game scene may further include virtual resource objects at relatively fixed positions, for example, the virtual resource objects (not shown) of a ground, a mountain, a stone, a flower, grass, a tree and a building. The optional virtual characters 131, 132 and 133 may be enemy characters or ally characters. For example, for operations of attack, freeze or the like disadvantageous to the target virtual character, the optional virtual characters 131, 132 and 133 may be the virtual characters of the enemy faction. For another example, for operations of regeneration and the like advantageous to the target virtual character, the optional virtual characters 131, 132 and 133 may be the virtual characters of the ally faction. There are no limits made in the present disclosure.

Figure 5:
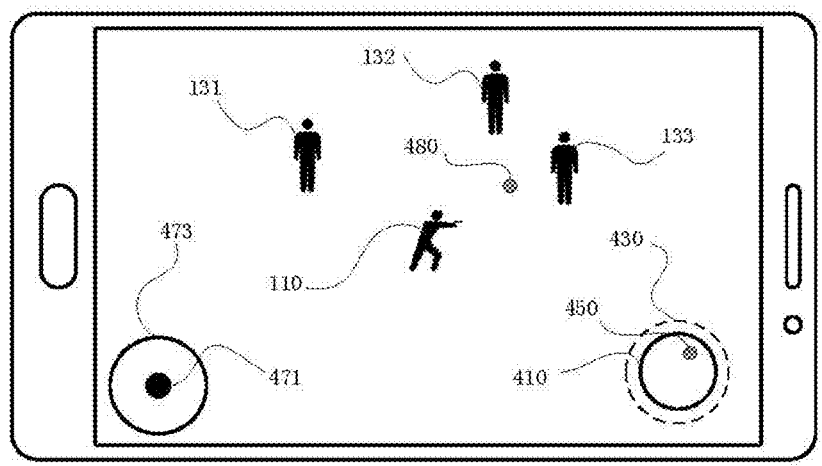
FIG. 5-7 are schematic diagrams of a target locking solution according to an exemplary embodiment of the present disclosure.
Figure 6:
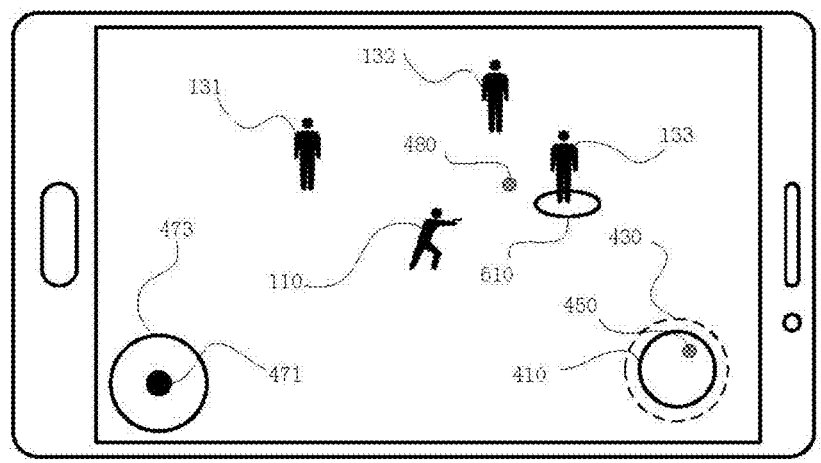
Figure 7:
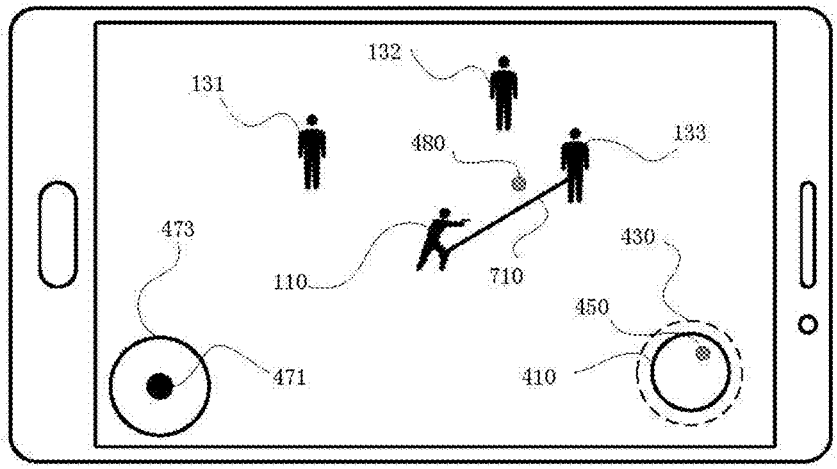

FIG. 5-7 are schematic diagrams of a target locking solution according to an exemplary embodiment of the present disclosure. As shown in FIG. 5, when detecting the preset touch operation of the touch medium within the effective operation range 430 of the first operation icon, the first position 480 is determined according to the position of the present touch point 450 of the touch medium. The first position 480 is updated according to the sliding trace of the touch medium when detecting the sliding touch operation of the touch medium.

The effective operation range 430 of the first operation icon may be configured to smaller than a range of the first operation icon 410, or may be configured to larger than or equal to the range of the first operation icon 410. For example, as shown in FIG. 5, an outer contour of the effective operation range 430 of the first operation icon and an outer contour of the first operation icon 410 are two concentric circles.

The preset touch operation may be different from the touch operation triggering the first operation, such as, double click, long press, heavy press and a sliding operation. In an optional embodiment, the preset touch operation is a sliding touch operation.

The first position 480 is determined according to the position of the present touch point 450 of the touch medium, which may be adopted through multiple specific implementation manners, and there are no limits made in the present disclosure. For example, the user virtual character 110 is located at a point A, there is a preset point C (for example, a central point of the first operation icon) within the effective operation range 430 of the first operation icon, the present touch point 450 is located at a point D, and then the first position 480 may be located at a point B. A line segment AB is parallel to a line segment CD, and a length ratio of the line segment AB to the line segment CD is a preset coefficient. For another example, the user virtual character 110 is located at the point A, there is the preset point C within the effective operation range 430 of the first operation icon, the present touch point 450 is located at the point D, and then the first position 480 may be located at the point B. The line segment AB is parallel to the line segment CD, and a length of the line segment AB is a preset value. It is important to note that the point A, the point B, the point C and the point D are not shown in FIG. 5-7. The four positions are adopted to describe a specific implementation process of determining the first position 480 according to the position of the present touch point 450.

After the first position 480 is determined, the sliding touch operation of the touch medium is continued to be detected, and the first position 480 is updated according to the sliding trace of the touch medium. As shown in FIG. 5, when the position of the present touch point 450 is changed, the first position 480 is re-determined through the abovementioned manner of determining the first position 480 according to the position of the present touch point 450 of the touch medium. The first position 480 may be updated according to a preset time interval (for example, an interval of 0.1 second, or 0.05 second), and the first position 480 may also be updated in real time.

In an optional embodiment, the step of detecting the sliding touch operation of the touch medium and updating the first position according to the sliding trace of the touch medium includes that: the sliding touch operation of the touch medium within a preset range is detected, and the first position is updated according to the sliding trace of the touch medium. The preset range at least partially covers the range of the first operation icon. In an optional embodiment, the preset range is larger than or equal to the effective operation range 430 of the first operation icon.

In an optional embodiment, when detecting the preset touch operation of the touch medium within the effective operation range of the first operation icon, besides determination of the first position according to the position of the present touch point of the touch medium, the first position may further be determined according to another preset rule. The sliding touch operation of the touch medium is detected, and the first position is updated according to the sliding trace of the touch medium.

Multiple specific implementation manners may be adopted to determine the first position 480 according to the preset rule, and there are no limits made in the present disclosure. For example, when detecting the preset touch operation of the touch medium within the effective operation range 430 of the first operation icon, the determined first position 480 may be a position where the user virtual character 110 is located and may also be a position where a certain optional virtual character closest to the user virtual character 110 is located, etc. Therefore, when detecting the preset touch operation of the touch medium within the effective operation range of the first operation icon, the first position is determined according to the preset rule. At this time, the first position 480 is unrelated to the position of the present touch point 450 but related to a specific preset rule. Then, the sliding touch operation of the touch medium is continued to be detected, and the first position is updated according to the sliding trace of the touch medium.

At Step S330, the optional virtual character is determined from the at least one optional virtual character as a preselected virtual character, and the position of the optional virtual character and the updated first position meet a preset condition.

In the embodiment, the optional virtual character, of which the position is closest to the first position in the at least one optional virtual character may be determined as the preselected virtual character. For example, as shown in FIG. 5, distances between each position of multiple optional virtual characters 131, 132 and 133 and the first position 480 at present moment are calculated, and the optional virtual character (for example, the optional virtual character 133), of which the position is closest to the first position 480 is determined as the preselected virtual character.

In an optional embodiment, the preset condition for determining the preselected virtual character may also be another single condition and may also be a combination of multiple conditions. There are no limits made in the present disclosure. The condition includes one of: any one optional virtual character in a plurality of optional virtual characters, of which the position are closest to the updated first position; the optional virtual character with the lowest HP value in a plurality of optional virtual characters, of which the position are closest to the updated first position; the optional virtual character with a predetermined type in a plurality of optional virtual characters, of which the position are closest to the updated first position; the optional virtual character, of which the position is at a distance within a preset distance far away from the updated first position and with the lowest HP value; any one optional virtual character, of which the position is at a distance within a preset distance far away from the updated first position; the optional virtual character, with the predetermined type, of which the position is located within a preset distance away from the updated first position; and the optional virtual character, of which the position is closest to a straight line passing through the updated first position and a position of the user virtual character.

It is important to note that the preselected virtual character is variable. Under the circumstance that the preset condition is determined (for example, the optional virtual character, of which the position is closest to the first position, is determined as the preselected virtual character), the preselected virtual character may be correspondingly changed along with the updating of the first position. For example, since the position of the present touch point 450 of a finger of the user is changed, the first position 480 may also be correspondingly changed, and the optional virtual character, of which the position is closest to the first position 480, may be changed from 133 to 132, so that the preselected virtual character is correspondingly changed.

At Step S350, visual marking is performed on the preselected virtual character so as to distinct from the other optional virtual characters.

When the preselected virtual character is determined according to the present first position 480, visual marking is performed on the present preselected virtual character to distinct from the other optional virtual characters. Therefore, the user may clearly identify the present preselected virtual character.

There are multiple specific implementation manners for performing visual marking on the preselected virtual character so as to distinct from the other optional virtual characters, which are not limited in the present disclosure. For example, as shown in FIG. 6, an indicator 610 (for example, a circular ring) is rendered at the position where the present preselected virtual character is located. For another example, as shown in FIG. 7, a connecting line 710 may be generated by rendering between the user virtual character 110 and the present preselected virtual character 133. In addition, the other distinctive indicating manners may also be adopted for visual indicating, for example, highlighting and stroking, so as to distinguish the preselected virtual character 133 from the other optional virtual characters.

In an optional embodiment, after the step of determining the optional virtual character from the at least one optional virtual character as the preselected virtual character, the method further includes that: the user virtual character is controlled to execute the first operation to the preselected virtual character. Therefore, the first operation is executed to the preselected virtual character at the same time when the preselected virtual character is determined. For example, the first operation is a normal attack operation, the preselected virtual character at a certain moment is 133, and at this time, the user virtual character 110 is controlled to execute the normal attack operation to the preselected virtual character 133. In such a manner, the corresponding first operation may also be executed in a target selection process (before a locking target is finally determined), so that the operations are executed more continuously, and time of the operation is fully utilized.

At Step S370, when detecting the touch medium leaves the touch screen, the present preselected virtual character is locked as the target virtual character of the first operation. In such a manner, the user may intuitively select the target virtual character in the core battle visual region the user pays attention to. Such an operation manner has the advantages that: the operations are intuitive, the portraits of the virtual characters are not required to be memorized, and difficulty of the operation is reduced, so that the user experience is improved, meanwhile, a display space of the touch screen is saved in order to prevent such different display regions are mutually covered each other.

For example, as shown in FIG. 7, after the preselected virtual character 133 is determined, when detecting the touch medium leaves the touch screen at this time, the preselected virtual character 133 is locked as the target virtual character of the first operation. Thereafter, when detecting the touch operation triggering the first operation (for example, a click operation is performed within the effective operation range 430 of the first operation icon), the user virtual character 110 determines the locked target virtual character 133 as a target of the first operation.

In an optional embodiment, the method further includes that: when detecting a preset unlocking event, locking of the target virtual character is released.

There may be multiple preset unlocking events, which are not limited in the present disclosure. For example, after detecting elapse of a preset time (as a time threshold), locking of the target virtual character is released. For another example, when detecting a distance between the position of the target virtual character and the position of the user virtual character is exceeded to a preset distance (as a distance threshold), locking of the target virtual character is released.

In an optional embodiment, the game interface further includes a second operation icon, and the user virtual character is configured to execute a second operation corresponding to the second operation icon at least according to a received second interaction instruction. Moreover, a minimum time interval between two first operations executed by the user virtual character is shorter than a minimum time interval between two second operations executed by the user virtual character.

For example, as shown in FIG. 1, there are a plurality of operation icons arranged on the right side of the screen. Such operation icons include the first operation icon and the second operation icon. The user virtual character 110 may execute the second operation corresponding to the second operation icon according to the received second interaction instruction (for example, an interaction instruction generated according to a touch operation acting on the second operation icon). Moreover, the minimum time interval between two first operations executed by the user virtual character is shorter than the minimum time interval between two second operations executed by the user virtual character. Since the minimum time interval between two first operations executed by the user virtual character is shorter than the minimum time interval between two second operations executed by the user virtual character, compared with the second operation, the first operation may be executed more continuously. And the target locking operation may be combined with the first operation to execute operations in a more continuous manner, greatly improve continuity of the operation and increase a utilization rate of time. In an optional embodiment, the first operation is a normal attack operation, and the second operation is a skill attack operation.

In an optional embodiment, after the step of locking the preselected virtual character as the target virtual character of the first operation when detecting the touch medium leaves the touch screen, the method further includes that: when detecting the touch medium leaves the touch screen, the preselected virtual character is locked as a target virtual character of the second operation. In such a manner, after the target virtual character is locked and before locking is released, the user virtual character may determine the target virtual character as an execution object of at least one of the first operation and the second operation. Therefore, the locked target may be applied more widely. That is, the target virtual character may be determined as the execution object of the first operation and may also be determined as the execution object of the second operation.

In an embodiment of the present disclosure, an interaction apparatus for locking a target in a game is further provided, which is applied to a mobile terminal with a touch screen. A content rendered on the touch screen includes a game interface. And the game interface includes a first operation icon, a user virtual character and at least one optional virtual character. The user virtual character is configured to at least execute a first operation corresponding to the first operation icon according to a received first interaction instruction. The apparatus includes: a processor coupled with a memory and configured to execute program elements stored on the memory, and the program element includes:

a position detection element, configured to, when detecting a preset touch operation of a touch medium within an effective operation range of the first operation icon, determine a first position in the game interface, detect a sliding touch operation of the touch medium and update the first position according to a sliding trace of the touch medium;

a pre-selection determination element, configured to determine an optional virtual character from the at least one optional virtual character as a preselected virtual character, and the position of the optional virtual character and the updated first position meet a preset condition;

a visual marking element, configured to perform visual marking on the preselected virtual character so as to distinct from other optional virtual characters; and a target locking element, configured to, when detecting the touch medium leaves the touch screen, lock the present preselected virtual character as a target virtual character of the first operation.

In an embodiment of the present disclosure, an electronic device is further provided, which includes: a processing component and a memory resource represented by a memory. The processing component may further include at least one processor. The memory is configured to store instructions executable for the processing component, such as, application programs. The application programs stored in the memory may include at least one component of which each corresponds to a set of instructions. In addition, the processing component is configured to execute the instructions to execute the abovementioned method.

The electronic device may further include: a power component, a wired or wireless network interface and an Input/Output (I/O) interface. The power component is configured to execute power management on the electronic device. The wired or wireless network interface is configured to connect the electronic device to a network. The electronic device may be operated on a basis of an operating system stored in the memory, such as, Android, iOS, Windows, Mac OS X, Unix, Linux and FreeBSD.

In an embodiment of the present disclosure, a computer-readable storage medium is further provided, on which a program product capable of implementing the method of the specification is stored. In some possible implementation modes, each aspect of the present disclosure may further be implemented into a form of program product including a program code. And when the program code runs on a terminal device, the program code is configured to enable the terminal device to execute the steps, described in the "exemplary method" part of the specification, according to various exemplary implementation modes of the present disclosure. The program product may adopt a portable Compact Disc Read-Only Memory (CD-ROM), includes the program code and may run on the terminal device, such as, a personal computer. However, the program product of the present disclosure is not limited. In the present disclosure, the readable storage medium may be any physical medium including or storing a program, and the program may be used by or combined with an instruction execution system, apparatus or device.

The program product may adopt one or any combination of more of readable media. The readable medium may be a readable signal medium or a readable storage medium. For example, the readable storage medium may be, but not limited to, an electric, magnetic, optical, electromagnetic, infrared or semiconductor system, apparatus or device or any combination thereof. A more specific example (non-exhaustive list) of the readable storage medium includes: an electric connection with one or more wires, a portable disk, a hard disk, a Random Access Memory (RAM), a Read-Only Memory (ROM), an Erasable Programmable ROM (EPROM) (or flash memory), an optical fiber, a portable CD-ROM, an optical storage apparatus, a magnetic storage apparatus or any proper combination thereof.

Sequence numbers of the embodiments of the present disclosure are intended for description and do not represent quality of the embodiments.

In the embodiments of the present disclosure, each embodiment is described with different emphases, and parts undetailed in a certain embodiment may refer to related descriptions in the other embodiments.

In some embodiments provided by the application, it should be understood that the disclosed technical content may be implemented in another manner, and the apparatus embodiment described above is schematic. And for example, division of the units is logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the units or the modules, and may be electrical or adopt other forms.

The units described as separate parts may or may not be physically separated, and parts displayed as units may or may not be physical units, and namely may be located in the same place, or may also be distributed to multiple units. Part or all of the units may be selected to achieve the purpose of the solutions of the embodiments according to a practical requirement.

In addition, each function unit in each embodiment of the present disclosure may be integrated into a processing unit, each unit may also physically exist independently, and at least two units may also be integrated into a unit. The integrated unit may be implemented in a hardware form, and may also be implemented in form of software function unit.

When being implemented in form of software function unit and sold or used as an independent product, the integrated unit may also be stored in a computer-readable storage medium. Based on such an understanding, the technical solutions of the present disclosure substantially or parts making contributions to a conventional art or all or part of the technical solutions may be embodied in form of software product. And the computer software product is stored in a storage medium, including a plurality of instructions configured to enable a computer device (which may be a personal computer, a server, a network device or the like) to execute all or part of the steps of the method in each embodiment of the present disclosure.

The above are exemplary implementation mode of the present disclosure. It should be pointed out that those of ordinary skilled in the art may further make a plurality of improvements and embellishments without departing from the principle of the present disclosure and these improvements and embellishments shall also fall within the scope of protection of the present disclosure.

What is claimed is:

1. An interaction method for locking a target in a game, applied to a mobile terminal with a touch screen, a content rendered on the touch screen comprising a game interface and the game interface comprising a first operation icon, a user virtual character and at least one optional virtual character, wherein the user virtual character is configured to execute a first operation corresponding to the first operation icon at least according to a received first interaction instruction, the method comprising:
   when detecting a preset touch operation of a touch medium, determining a first position in the game interface, detecting a sliding touch operation of the touch medium, and updating the first position according to a sliding trace of the touch medium, wherein a position in the game interface where the user virtual character is located and the first position constitute a first virtual line segment, a preset point within an effective operation range of the first operation icon and a position of a present touch point of the touch medium constitute a second virtual line segment, the first virtual line segment is parallel to the second virtual line segment, and a length ratio of the first virtual line segment to the second virtual line segment is a preset coefficient;
   determining an optional virtual character from the at least one optional virtual character as a preselected virtual character, wherein a position of the optional virtual character and the updated first position meet a preset condition;
   performing visual marking on the preselected virtual character so as to distinct from other optional virtual characters; and
   when detecting the touch medium leaves the touch screen, locking the preselected virtual character as a target virtual character of the first operation.

2. The method as claimed in claim 1, wherein the effective operation range of the first operation icon is larger than or equal to a range of the first operation icon.

3. The method as claimed in claim 1, wherein detecting the sliding touch operation of the touch medium and updating the first position according to the sliding trace of the touch medium comprises:
  detecting the sliding touch operation of the touch medium within a preset range, and updating the first position according to the sliding trace of the touch medium.

4. The method as claimed in claim 3, wherein the preset range is larger than or equal to the effective operation range of the first operation icon.

5. The method as claimed in claim 3, wherein the preset range at least partially covers the range of the first operation icon.

6. The method as claimed in claim 1, wherein the optional virtual character, of which the position and the updated first position meet the preset condition, comprises one of:
  the optional virtual character, of which the position is closest to the updated first position;
  any one optional virtual character in a plurality of optional virtual characters, of which the position are closest to the updated first position;
  the optional virtual character with the lowest Health Points (HP) value in a plurality of optional virtual characters, of which the position are closest to the updated first position;
  the optional virtual character with a predetermined type in a plurality of optional virtual characters, of which the position are closest to the updated first position;
  the optional virtual character, of which the position is at a distance within a preset distance far away from the updated first position and with the lowest HP value;
  any one optional virtual character, of which the position is at a distance within a preset distance far away from the updated first position;
  the optional virtual character, with the predetermined type, of which the position is located within a preset distance away from the updated first position; and
  the optional virtual character, of which the position is closest to a straight line passing through the updated first position and a position of the user virtual character.

7. The method as claimed in claim 1, after determining the optional virtual character from the at least one optional virtual character as the preselected virtual character, further comprising:
  controlling the user virtual character to execute the first operation to the preselected virtual character.

8. The method as claimed in claim 1, wherein the game interface further comprises a second operation icon, the user virtual character is configured to execute a second operation corresponding to the second operation icon at least according to a received second interaction instruction, and a minimum time interval between two first operations executed by the user virtual character is shorter than a minimum time interval between two second operations executed by the user virtual character.

9. The method as claimed in claim 8, wherein the first operation is a normal attack operation, and the second operation is a skill attack operation.

10. The method as claimed in claim 8, further comprising:
  when detecting the touch medium leaves the touch screen, locking the present preselected virtual character as a target virtual character of the second operation.

11. The method as claimed in claim 1, further comprising: when detecting a preset unlocking event, releasing locking of the target virtual character.

12. The method as claimed in claim 11, wherein the preset unlocking event comprises one of:
  reaching a time threshold; and
  a distance between a position of the user virtual character and a position of the preselected virtual character exceeding a distance threshold.

13. The method as claimed in claim 1, wherein determining the first position in the game interface when detecting the preset touch operation comprises:
  when detecting the preset touch operation, determining the first position according to a position of a present touch point of the touch medium.

14. The method as claimed in claim 1, wherein the effective operation range of the first operation icon is smaller than the range of the first operation icon.

15. The method as claimed in claim 1, wherein the preset touch operation comprises one of: a double click control operation, a long press control operation, a heavy press touch operation and a sliding touch operation.

16. The method as claimed in claim 1, wherein performing visual marking on the preselected virtual character so as to distinct from the other optional virtual characters comprises one of:
  rendering an indicator at a position of the preselected virtual character;
  rendering a connecting line between the user virtual character and the preselected virtual character;
  highlighting the preselected virtual character; and
  stroking the preselected virtual character.

17. An interaction apparatus for locking a target in a game, applied to a mobile terminal with a touch screen, a content rendered on the touch screen comprising a game interface and the game interface comprising a first operation icon, a user virtual character and at least one optional virtual character, wherein the user virtual character is configured to execute a first operation corresponding to the first operation icon at least according to a received first interaction instruction, the apparatus comprising: a processor, coupled with a memory and configured to execute program elements stored on the memory, wherein the program elements comprise:
  a position detection element, configured to, when detecting a preset touch operation of a touch medium within an effective operation range of the first operation icon, determine a first position in the game interface, detect a sliding touch operation of the touch medium and update the first position according to a sliding trace of the touch medium, wherein a position in the game interface where the user virtual character is located and the first position constitute a first virtual line segment, a preset point within an effective operation range of the first operation icon and a position of a present touch point of the touch medium constitute a second virtual line segment, the first virtual line segment is parallel to the second virtual line segment, and a length ratio of the first virtual line segment to the second virtual line segment is a preset coefficient;
  a pre-selection determination element, configured to determine an optional virtual character from the at least one optional virtual character as a preselected virtual character, wherein a position of the optional virtual character and the updated first position meet a preset condition;
  a visual marking element, configured to perform visual marking on the preselected virtual character so as to distinct from other optional virtual characters; and
  a target locking element, configured to, when detecting the touch medium leaves the touch screen, lock the present preselected virtual character as a target virtual character of the first operation.

18. An electronic device executing an interaction method for locking a target in a game, comprising:
- a processor; and
- a memory, configured to store at least one instruction executable for the processor,
- wherein the processor is configured to execute the at least one instruction to execute the following steps:
- when detecting a preset touch operation of a touch medium, determining a first position in a game interface, detecting a sliding touch operation of the touch medium, and updating the first position according to a sliding trace of the touch medium, wherein a position in the game interface where a user virtual character is located and the first position constitute a first virtual line segment, a preset point within an effective operation range of a first operation icon and a position of a present touch point of the touch medium constitute a second virtual line segment, the first virtual line segment is parallel to the second virtual line segment, and a length ratio of the first virtual line segment to the second virtual line segment is a preset coefficient;
- determining an optional virtual character from at least one optional virtual character as a preselected virtual character, wherein a position of the optional virtual character and the updated first position meet a preset condition;
- performing visual marking on the preselected virtual character so as to distinct from other optional virtual characters; and
- when detecting the touch medium leaves a touch screen, locking the preselected virtual character as a target virtual character of the first operation.

19. A computer-readable storage medium applied to an interaction method for locking a target in a game, on which a computer program is stored, the computer program being executed by a processor to implement the following steps:
- when detecting a preset touch operation of a touch medium, determining a first position in a game interface, detecting a sliding touch operation of the touch medium, and updating the first position according to a sliding trace of the touch medium, wherein a position in the game interface where a user virtual character is located and the first position constitute a first virtual line segment, a preset point within an effective operation range of a first operation icon and a position of a present touch point of the touch medium constitute a second virtual line segment, the first virtual line segment is parallel to the second virtual line segment, and a length ratio of the first virtual line segment to the second virtual line segment is a preset coefficient;
- determining an optional virtual character from at least one optional virtual character as a preselected virtual character, wherein a position of the optional virtual character and the updated first position meet a preset condition;
- performing visual marking on the preselected virtual character so as to distinct from other optional virtual characters; and
- when detecting the touch medium leaves a touch screen, locking the preselected virtual character as a target virtual character of the first operation.

* * * * *